United States Patent [19]

McDuffee et al.

[11] 4,389,428

[45] Jun. 21, 1983

[54] METHOD OF REJACKETING A FUSION SPLICE IN AN ULTRAVIOLET LIGHT CURABLE RESIN JACKETED OPTICAL FIBER

[75] Inventors: Frederick T. McDuffee, Manchester, N.H.; Carrie L. Kozikowski, Bedford, Va.

[73] Assignee: International Telephone and Telegraph Corporation, New York, N.Y.

[21] Appl. No.: 357,950

[22] Filed: Mar. 15, 1982

[51] Int. Cl.³ .................................... B05D 3/06
[52] U.S. Cl. .................... 427/54.1; 156/48; 156/51; 264/271.1; 427/140; 427/163
[58] Field of Search .................. 156/49, 51, 55, 48; 427/54.1, 163, 140, 142; 264/271.1, 272.11, 272.15, 275

[56] References Cited

U.S. PATENT DOCUMENTS

| | | | |
|---|---|---|---|
| 3,914,145 | 10/1975 | Forler et al. | 427/140 |
| 4,049,480 | 9/1977 | Kutsche | 156/94 |
| 4,091,062 | 5/1978 | Nelson | 156/49 |
| 4,135,587 | 1/1979 | Diaz | 156/49 |
| 4,152,539 | 5/1979 | Charlebois et al. | 156/49 |
| 4,201,618 | 5/1980 | Lewis | 156/502 |
| 4,270,021 | 5/1981 | Gold | 156/48 |

*Primary Examiner*—John H. Newsome
*Attorney, Agent, or Firm*—John T. O'Halloran; Robert P. Seitter

[57] ABSTRACT

The method of rejacketing a fusion splice in an ultraviolet light curable resin jacketed optical fiber comprises the steps of forming a disposable ultraviolet transparent mold including a cylindrical passageway having a diameter equal to the diameter of the jacketed optical fiber; placing the jacketed optical fiber in the passageway with the splice without a jacket thereon being disposed a predetermined distance from the mold; applying an ultraviolet curable resin to an end of the passageway adjacent the splice; pulling the splice very slowly through the resin into the passageway along with a portion of the resin; curing the resin under an ultraviolet lamp; and removing the mold in a destructive manner from the optical fiber after the splice has been completely rejacketed.

26 Claims, 4 Drawing Figures

METHOD OF REJACKETING A FUSION SPLICE IN AN ULTRAVIOLET LIGHT CURABLE RESIN JACKETED OPTICAL FIBER

BACKGROUND OF THE INVENTION

The present invention relates to a method for restoring the buffer coating or jacket on an ultraviolet (UV) light curable resin coated optical fiber at a fusion splice.

In considering splicing as a means to achieve long lengths of strong fiber, one restriction can be addressed immediately. Since the spliced region must be handled in cabling, precision winding or in payout in exactly the same way as the rest of the optical fiber, the finished splice, including jacket repair, must conform to the original fiber in physical dimensions as well as flexibility. This precludes the use of stiffeners in the spliced region, including hard epoxy masses or stainless steel tubes. Because of the strength requirements, only methods of directly fusing the fibers together for the splicing arrangement can be considered.

In order to meet or attain the desired performance from the spliced fiber, the splice must be rejacketed with the original jacket material with certain constraints placed on the rejacketed splice dimensions. In the case of fibers used for precision winding, such as rapid payout fibers for missile guidance, the splice must be as close as possible, but not greater than the original jacket outer diameter. Oversized splices will disturb the precision winding for all winding layers above the splice. Small voids can be tolerated over the short length of a splice (less than 15 mm) because a void filling compound is typically used in the precision winding process.

Devices or techniques used to rejacket the splices in the past have included a precision injection mold, a precision casting mold, or a simple dip coat. These devices or techniques work well with heat cured material. However, UV cured resins require a UV transparent mold. Also, injection or casting molds leave some form of flash or excess material on the splice which must be removed in a separate process step, often resulting in a loss of precision diameter control. Also, precision injection molds or casting molds do not compensate for changes in fiber diameter, i.e. these molds have a fixed size.

SUMMARY OF THE INVENTION

An object of the present invention is to provide a method of rejacketing a fusion splice in an ultraviolet light curable resin jacketed optical fiber which overcomes the above-mentioned difficulties (flash, UV transparency and fixed sized).

A feature of the present invention is the provision of a method of rejacketing a fusion splice in an ultraviolet light curable resin jacketed optical fiber comprising the steps of forming an ultraviolet light transparent mold including a cylindrical passageway having a diameter equal to the diameter of the jacketed optical fiber; placing the jacketed optical fiber in the passageway with the splice without a jacket thereon being disposed a predetermined distance from the transparent mold; applying an ultraviolet curable resin to an end of the passageway adjacent the splice; pulling the splice very slowly through the resin into the passageway along with a portion of the resin; curing the resin under an ultraviolet lamp; and removing the transparent mold from the optical fiber after the splice has been completely rejacketed.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
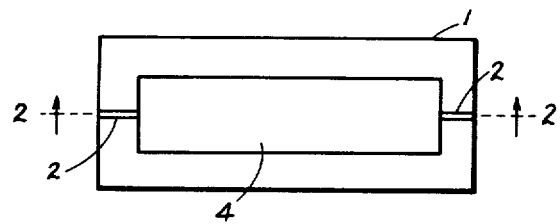
FIG. 1 is a top view of an outer mold used in forming the UV transparent mold employed in the method according to the principles of the present invention.
Figure 2:
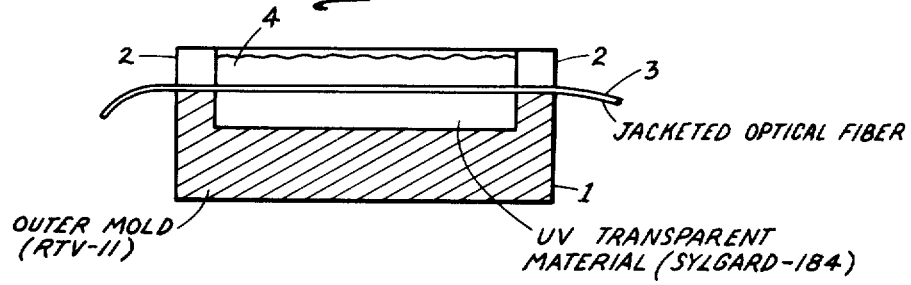
FIG. 2 is a cross-sectional view of the outer mold taken along line 2—2 of FIG. 1.
Figure 3:
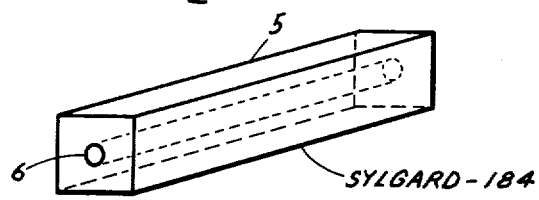
FIG. 3 is a perspective view of the UV transparent mold obtained from the outer mold of FIGS. 1 and 2.
Figure 4:
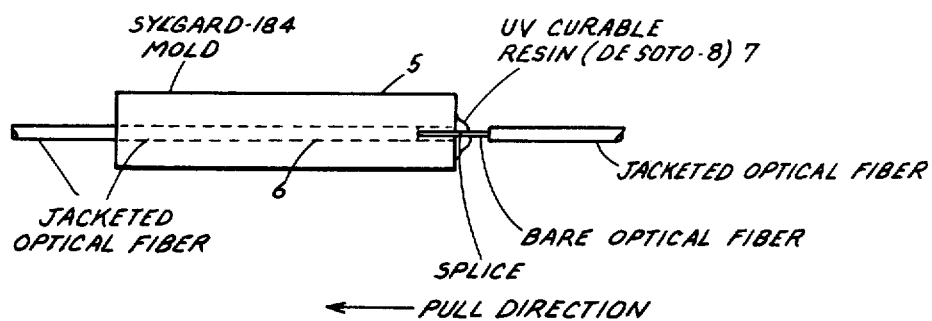
FIG. 4 is a schematic illustration of the mold of FIG. 3 employed in the method according to the principles of the present invention.

Basically, the method of the present invention employs a UV transparent material (SYLGARD-184) which is molded about the existing fiber jacket to custom form the mold diameter. The existing fiber is then removed from this mold, leaving a precision hole or passageway of the exact diameter of the existing fiber jacket diameter. The mold of the present invention does not allow for flash because it is a one piece mold and because of the fabrication method described hereinbelow. The splice is easily removed from the mold since the UV resin does not bond to the mold material. No mold release is required.

The rejacketing method comprises a UV transparent mold which is made around a straight piece of the original jacketed optical fiber. The first working molds were made using a RTV-11 outer mold which was made around a metal object. After the RTV-11 outer mold was cured and the metal object was removed, slits were made with a razor blade in the opposite sides of the mold for holding an optical fiber down in the the cavity created by the metal object.

If an outer mold of this type is not available, any container with a means for holding a straight piece of optical fiber (clips or tape) can be used.

The SYLGARD-184 (or any material transparent to ultraviolet light) was then poured into the cavity of the outer mold 1. The fiber 3 was pushed down into the slits 2 and pulled straight. The friction of the outer mold 1 holds fiber 3 fairly straight. The SYLGARD-184 was then deaired so no air bubbles were trapped around fiber 3. The SYLGARD-184 mold was allowed to cure at 150° C. for 2 hours.

The SYLGARD mold and fiber 3 were removed from the outer mold 1 and the fiber 3 pulled out of the SYLGARD mold to provide the mold 5 having a passageway 6 therethrough with a diameter equal to the diameter of the jacketed material of the optical fiber being spliced and which requires rejacketing in the splice area. Mold 5 was then trimmed with a razor blade so all the sides were smooth and straight. The resulting mold 5 was about ⅜" long.

The jacketed optical fiber to be spliced was bared in the splice region and then threaded through passage 6 of mold 5. The fusion splice was made and the splice was pulled back to the mold 5 until it was about ⅛" away from the adjacent end of passageway 6. Using a toothpick or other similar implement, a drop of the rejacketing material, an ultraviolet light curable resin such as DE SOTO 8 was then placed on the end of the mold 5. The ultraviolet curable resin could then be deaired for better results. The splice was then pulled, very slowly, through the UV curable resin 7 into the passageway 6 of mold 5, the vacuum created by this pulling operation pulling the resin in with the splice. The remainder of the small drop of UV resin was then cleaned with a Q-tip brand cotton swab or similar implement. The entire mold with the splice region therein was then placed under a UV lamp until the jacketing material was cured. The splice was then pulled out of mold 5 and inspected. This procedure can be repeated if large gaps are visible in the rejacketing area. Once the rejacketing area is completely rejacketed, the mold 5 is then torn off the fiber and thrown away. Essentially this method uses a mold which is made around a straight fiber of the same jacket diameter as the fiber to be spliced with this mold being transparent to UV light. The vacuum created by pulling the jacketed fiber, then the splice, into the mold draws the UV curable resin in with the splice. The friction of the mold holds the fiber straight resulting in a concentric rejacketing. Since the ultraviolet visible mold shrinks slightly when curing, the diameter of the hole in the mold for the fiber is slightly smaller than the fiber diameter, resulting in a rejacketing which is slightly smaller in diameter (i.e. no lumps).

The present method can be employed to rejacket a fusion splice for fibers coated with or jacketed with any UV curable epoxy. The method can also be used in any application requiring a precision overjacket on a spliced fiber.

While we have described above the principles of our invention in connection with specific apparatus it is to be clearly understood that this description is made only by way of example and not as a limitation to the scope of our invention as set forth in the objects thereof and in the accompanying claims.

We claim:
1. A method of rejacketing a fusion splice in an ultraviolet light curable resin jacketed optical fiber comprising the steps of
  forming an ultraviolet light transparent mold including a cylindrical passageway having a diameter equal to the diameter of said jacketed optical fiber;
  placing said jacketed optical fiber in said passageway with said splice without a jacket thereon being disposed a predetermined distance from said transparent mold;
  applying an ultraviolet curable resin to an end of said passageway adjacent said splice;
  pulling said splice very slowly through said resin into said passageway along with a portion of said resin;
  curing said resin under an ultraviolet lamp; and
  removing said transparent mold from said optical fiber after said splice has been completely rejacketed.

2. A method according to claim 1, further including the steps of
  pulling said splice from said passageway between said curing step and said removing step;
  inspecting said rejacketed area of said optical fiber; and
  repeating said applying, pulling and curing steps if large gaps in said cured resin are visible during said inspecting step, the last three steps being repeated until said splice is completely rejacketed.

3. A method according to claims 1 or 2, wherein
  said transparent mold is a disposable transparent mold; and
  said step of removing includes the step of tearing said transparent mold from said optical fiber.

4. A method according to claims 1 or 2, wherein
  said step of forming includes
    making an outer mold around a metal object,
    curing said outer mold,
    removing said metal object to provide a cavity in said outer mold,
    slitting opposite sides of said outer mold to hold a straight piece of said jacketed optical fiber,
    pouring an ultraviolet transparent material into said cavity,
    placing said straight piece of said jacketed optical fiber in said slits and said material,
    curing said material at a given temperature for a given period of time,
    removing said cured material and said straight piece of said jacketed optical fiber from said outer mold, and
    removing said straight piece of said jacketed optical fiber from said cured material to provide said transparent mold.

5. A method according to claim 4, wherein
  said given temperature is 150° C. and said given period of time is two hours.

6. A method according to claim 5, further including the step of
  trimming said cured material after said step of removing said straight piece of said jacketed optical fiber therefrom so all sides of said transparent mold are smooth and straight.

7. A method according to claim 6, further including the step of
  deairing said ultraviolet transparent material after said step of placing to prevent entrapment of air bubbles around said straight piece of said optical fiber.

8. A method according to claim 7, wherein
  said mold is a disposable mold, and
  said step of removing said transparent mold from said optical fiber includes the step of tearing said transparent mold from said optical fiber.

9. A method according to claim 4, further including the step of
  trimming said cured material after said step of removing said straight piece of said jacketed optical fiber therefrom so all sides of said transparent mold are smooth and straight.

10. A method according to claim 9, further including the step of
  deairing said ultraviolet transparent material after said step of placing to prevent entrapment of air bubbles around said straight piece of said optical fiber.

11. A method according to claim 10, wherein
  said mold is a disposable mold, and
  said step of removing said transparent mold from said optical fiber includes the step of tearing said transparent mold from said optical fiber.

12. A method according to claim 4, further including the step of
  deairing said ultraviolet transparent material after said step of placing to prevent entrapment of air bubbles around said straight piece of said optical fiber.

13. A method according to claim 12, wherein
said mold is a disposable mold, and
said step of removing said transparent mold from said optical fiber includes the step of tearing said transparent mold from said optical fiber.

14. A method according to claim 4, wherein
said mold is a disposable mold, and
said step of removing said transparent mold from said optical fiber includes the step of tearing said transparent mold from said optical fiber.

15. A method according to claims 1 or 2, further including the step of
deairing said curable resin prior to said pulling step.

16. A method according to claim 15, wherein
said step of forming includes
making an outer mold around a metal object,
curing said outer mold,
removing said metal object to provide a cavity in said outer mold,
slitting opposite sides of said outer mold to hold a straight piece of said jacketed optical fiber,
pouring an ultraviolet transparent material into said cavity,
placing said straight piece of said jacketed optical fiber in said slits and said material,
curing said material at a given temperature for a given period of time,
removing said cured material and said straight piece of said jacketed optical fiber from said outer mold, and
removing said straight piece of said jacketed optical fiber from said cured material to provide said transparent mold.

17. A method according to claim 16, wherein
said given temperature is 150° C. and said given period of time is two hours.

18. A method according to claim 17, further including the step of
trimming said cured material after said step of removing said straight piece of said jacketed optical fiber therefrom so all sides of said transparent mold are smooth and straight.

19. A method according to claim 18, further including the step of
deairing said ultraviolet transparent material after said step of placing to prevent entrapment of air bubbles around said straight piece of said optical fiber.

20. A method according to claim 19, wherein
said mold is a disposable mold, and
said step of removing said transparent mold from said optical fiber includes the step of tearing said transparent mold from said optical fiber.

21. A method according to claim 16, further including the step of
trimming said cured material after said step of removing said straight piece of said jacketed optical fiber therefrom so all sides of said transparent mold are smooth and straight.

22. A method according to claim 21, further includes the step of
deairing said ultraviolet transparent material after said step of placing to prevent entrapment of air bubbles around said straight piece of said optical fiber.

23. A method according to claim 22, wherein
said mold is a disposable mold, and
said step of removing said transparent mold from said optical fiber includes the step of tearing said transparent mold from said optical fiber.

24. A method according to claim 16, further including the step of
deairing said ultraviolet transparent material after said step of placing to prevent entrapment of air bubbles around said straight piece of said optical fiber.

25. A method according to claim 24, wherein
said mold is a disposable mold, and
said step of removing said transparent mold from said optical fiber includes the step of tearing said transparent mold from said optical fiber.

26. A method according to claim 16, wherein
said mold is a disposable mold, and
said step of removing said transparent mold from said optical fiber includes the step of tearing said transparent mold from said optical fiber.

* * * * *

UNITED STATES PATENT AND TRADEMARK OFFICE
CERTIFICATE OF CORRECTION

PATENT NO. : 4,389,428
DATED : June 21, 1983
INVENTOR(S) : Frederick T. McDuffee and Carrie L. Kozikowski It is certified that error appears in the above—identified patent and that said Letters Patent is hereby corrected as shown below:

Column 1, after line 5, insert --The Government has rights in this invention pursuant to Subcontract No. 6-909510-C-M7T under Contract No. DAAK80-C-0595 awarded by the Department of the Army.--

Signed and Sealed this

Thirtieth Day of December, 1986

Attest:

DONALD J. QUIGG

Attesting Officer

Commissioner of Patents and Trademarks